(12) United States Patent
Glenn et al.

(10) Patent No.: US 11,069,179 B2
(45) Date of Patent: Jul. 20, 2021

(54) GAMING MACHINE HAVING ENHANCED EMOTIVE LIGHTING

(71) Applicant: SG Gaming, Inc., Las Vegas, NV (US)

(72) Inventors: Robert Glenn, Chicago, IL (US); Paul Lesley, Chicago, IL (US)

(73) Assignee: SG Gaming, Inc., Las Vegas, NV (US)

( * ) Notice: Subject to any disclaimer, the term of this patent is extended or adjusted under 35 U.S.C. 154(b) by 29 days.

(21) Appl. No.: 16/584,223

(22) Filed: Sep. 26, 2019

(65) Prior Publication Data

US 2020/0111295 A1 Apr. 9, 2020

Related U.S. Application Data

(60) Provisional application No. 62/740,780, filed on Oct. 3, 2018.

(51) Int. Cl.
| | |
|---|---|
| *G07F 17/32* | (2006.01) |
| *G07F 17/34* | (2006.01) |
| *G02B 5/02* | (2006.01) |
| *A63F 9/24* | (2006.01) |
| *F21V 8/00* | (2006.01) |

(52) U.S. Cl.
CPC ............ *G07F 17/3213* (2013.01); *A63F 9/24* (2013.01); *G02B 5/021* (2013.01); *G02B 5/0278* (2013.01); *G02B 6/0028* (2013.01); *G02B 6/0096* (2013.01); *G07F 17/34* (2013.01)

(58) Field of Classification Search
CPC ......... A63F 9/02; G02B 5/021; G02B 5/0278; G02B 6/0028; G02B 6/0096; G02B 6/001; G02B 6/0018; G02B 6/0068; G07F 17/3213; G07F 17/34
See application file for complete search history.

(56) References Cited

U.S. PATENT DOCUMENTS

| | | | |
|---|---|---|---|
| 7,661,862 B2* | 2/2010 | Lee | G02B 6/0078 362/559 |
| 8,376,839 B2* | 2/2013 | Lesley | G07F 17/3211 463/25 |
| 8,777,757 B2 | 7/2014 | Chudek | |
| 8,808,088 B1* | 8/2014 | Brunell | G07F 17/3234 463/31 |
| 9,214,059 B2 | 12/2015 | Crivelli et al. | |
| 9,458,981 B2 | 10/2016 | Hwang et al. | |
| 10,019,868 B2 | 7/2018 | Castro et al. | |

(Continued)

*Primary Examiner* — Seng H Lim

(57) ABSTRACT

A gaming machine includes a cabinet, an emotive lighting system coupled to the cabinet the textured surface, and logic circuitry. The emotive lighting system includes a textured surface including a plurality of walls that define a plurality of channels, a first array of light-emitting devices oriented to emit light in a first direction, and an optical waveguide positioned over the first array of light-emitting devices. Each channel is aligned with at least one light-emitting device of the first array, and the optical waveguide guides light from the first array towards the channels in a second direction at an oblique or orthogonal angle relative from the first direction. The logic circuitry causes each light-emitting device of the first array to selectively emit light such that each channel is selectively illuminated with indirect light from the aligned light-emitting device and substantially isolated from indirect light emitted from unaligned light-emitting devices.

20 Claims, 10 Drawing Sheets

(56) References Cited

U.S. PATENT DOCUMENTS

| | | | |
|---|---|---|---|
| 10,096,202 B2 | 10/2018 | Castro et al. | |
| 10,209,427 B2* | 2/2019 | Cheng | G02B 6/0083 |
| 2005/0135116 A1* | 6/2005 | Epstein | G02B 6/0061 |
| | | | 362/615 |
| 2007/0164975 A1* | 7/2007 | Lim | H04N 5/64 |
| | | | 345/102 |
| 2007/0287528 A1* | 12/2007 | Hirato | G07F 17/3211 |
| | | | 463/20 |
| 2007/0287543 A1* | 12/2007 | Tanabe | G07F 17/34 |
| | | | 463/46 |
| 2008/0165306 A1* | 7/2008 | Kang | G02B 6/0055 |
| | | | 349/62 |
| 2010/0053229 A1* | 3/2010 | Krijn | G02B 6/0038 |
| | | | 345/690 |
| 2010/0246158 A1* | 9/2010 | Van Gorkom | F21V 14/003 |
| | | | 362/19 |
| 2010/0259470 A1* | 10/2010 | Kohtoku | G02B 6/0021 |
| | | | 345/102 |
| 2011/0118034 A1* | 5/2011 | Jaffe | G07F 17/3211 |
| | | | 463/42 |
| 2011/0201411 A1* | 8/2011 | Lesley | G07F 17/3244 |
| | | | 463/25 |
| 2012/0002438 A1* | 1/2012 | Gourlay | G02B 6/0043 |
| | | | 362/606 |
| 2012/0140520 A1* | 6/2012 | Jung | G02B 6/0083 |
| | | | 362/609 |
| 2012/0270648 A1* | 10/2012 | Rasmussen | G07F 17/3211 |
| | | | 463/30 |
| 2013/0010234 A1* | 1/2013 | Sung | G02B 5/0278 |
| | | | 349/95 |
| 2013/0157751 A1* | 6/2013 | Loose | G07F 17/3211 |
| | | | 463/25 |
| 2014/0056028 A1* | 2/2014 | Nichol | G02B 6/0075 |
| | | | 362/611 |
| 2014/0169027 A1* | 6/2014 | Cochran | F21S 2/00 |
| | | | 362/555 |
| 2014/0243067 A1* | 8/2014 | Silva | G02F 1/13476 |
| | | | 463/20 |
| 2016/0110951 A1 | 4/2016 | Caspi et al. | |
| 2016/0259117 A1* | 9/2016 | Wang | G02B 6/0096 |
| 2016/0364941 A1 | 12/2016 | Castro et al. | |
| 2016/0364946 A1* | 12/2016 | Castro | G02B 6/0096 |
| 2016/0370533 A1* | 12/2016 | York | G02B 6/0045 |
| 2017/0153383 A1* | 6/2017 | Lee | G02B 6/0026 |
| 2018/0003364 A1* | 1/2018 | Wheatley | G02B 5/0221 |
| 2018/0074247 A1* | 3/2018 | Asakawa | G02B 6/0021 |
| 2018/0330568 A1 | 11/2018 | Glenn et al. | |
| 2019/0004237 A1* | 1/2019 | Kitano | G02B 6/0055 |
| 2020/0142104 A1* | 5/2020 | Rosen | G02B 5/0289 |

* cited by examiner

US 11,069,179 B2

GAMING MACHINE HAVING ENHANCED EMOTIVE LIGHTING

CROSS-REFERENCE TO RELATED APPLICATIONS

This patent application claims the benefit of priority of U.S. Provisional Patent Application Ser. No. 62/740,780 filed on Oct. 3, 2018, the contents of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2018, Bally Gaming, Inc.

FIELD

The present disclosure relates generally to gaming systems, apparatus, and methods and, more particularly, to gaming machines having enhanced emotive lighting.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

As the industry matures, the creativity and ingenuity required to improve such operation of gaming apparatus and games grows accordingly.

SUMMARY

According to one aspect of the present disclosure, a gaming machine includes a cabinet, an emotive lighting system coupled to the cabinet the textured surface, and logic circuitry. The emotive lighting system includes a textured surface including a plurality of walls that define a plurality of channels, a first array of light-emitting devices oriented to emit light in a first direction, and an optical waveguide positioned over the first array of light-emitting devices. Each channel is aligned with at least one light-emitting device of the first array, and the optical waveguide guides light from the first array towards the channels in a second direction at an oblique or orthogonal angle relative from the first direction. The logic circuitry causes each light-emitting device of the first array to selectively emit light such that each channel is selectively illuminated with indirect light from the aligned light-emitting device and substantially isolated from indirect light emitted from unaligned light-emitting devices.

According to another aspect of the present disclosure, a method of operating a gaming machine including an emotive lighting system is provided. The gaming machine includes logic circuitry communicatively coupled to the emotive lighting system. The method includes causing, by the logic circuitry, a first array of light-emitting devices oriented to face a first direction of the emotive lighting system to emit light according to a first lighting sequence, receiving, by an optical waveguide of the emotive lighting system, the light emitted in the first direction by the first array, guiding, by the optical waveguide, the received light towards a second direction, emitting, by the optical waveguide, indirect light from the first array towards a textured surface of the emotive lighting system that includes a plurality of walls that define a plurality of channels in the second direction, and receiving, by at least one channel, the indirect light.

According to yet another aspect of the present disclosure, a gaming system includes a gaming machine and logic circuitry. The gaming machine includes a cabinet and an emotive lighting system coupled to the cabinet the textured surface. The emotive lighting system includes a textured surface including a plurality of walls that define a plurality of channels, a first array of light-emitting devices oriented to emit light in a first direction, and an optical waveguide positioned over the first array of light-emitting devices. Each channel is aligned with at least one light-emitting device of the first array, and the optical waveguide guides light from the first array towards the channels in a second direction at an oblique or orthogonal angle relative from the first direction. The logic circuitry causes each light-emitting device of the first array to selectively emit light such that each channel is selectively illuminated with indirect light from the aligned light-emitting device and substantially isolated from indirect light emitted from unaligned light-emitting devices.

According to a further aspect of the present disclosure, a method of assembling an emotive lighting system for a gaming machine is provided. The method includes coupling a lighting assembly to an optical waveguide. The lighting assembly includes a first array of light-emitting devices covered by the optical waveguide when coupled together and a second array of light-emitting devices uncovered by the optical waveguide when coupled together. The method further includes coupling the optical waveguide to a textured surface offset from the lighting assembly and including a plurality of walls that define a plurality of channels, coupling the optical waveguide to a diffuser panel that diffuses light received from the lighting assembly, and coupling the textured surface to a cabinet of the gaming machine.

Additional aspects of the invention will be apparent to those of ordinary skill in the art in view of the detailed description of various embodiments, which is made with reference to the drawings, a brief description of which is provided below.

Figure 1:
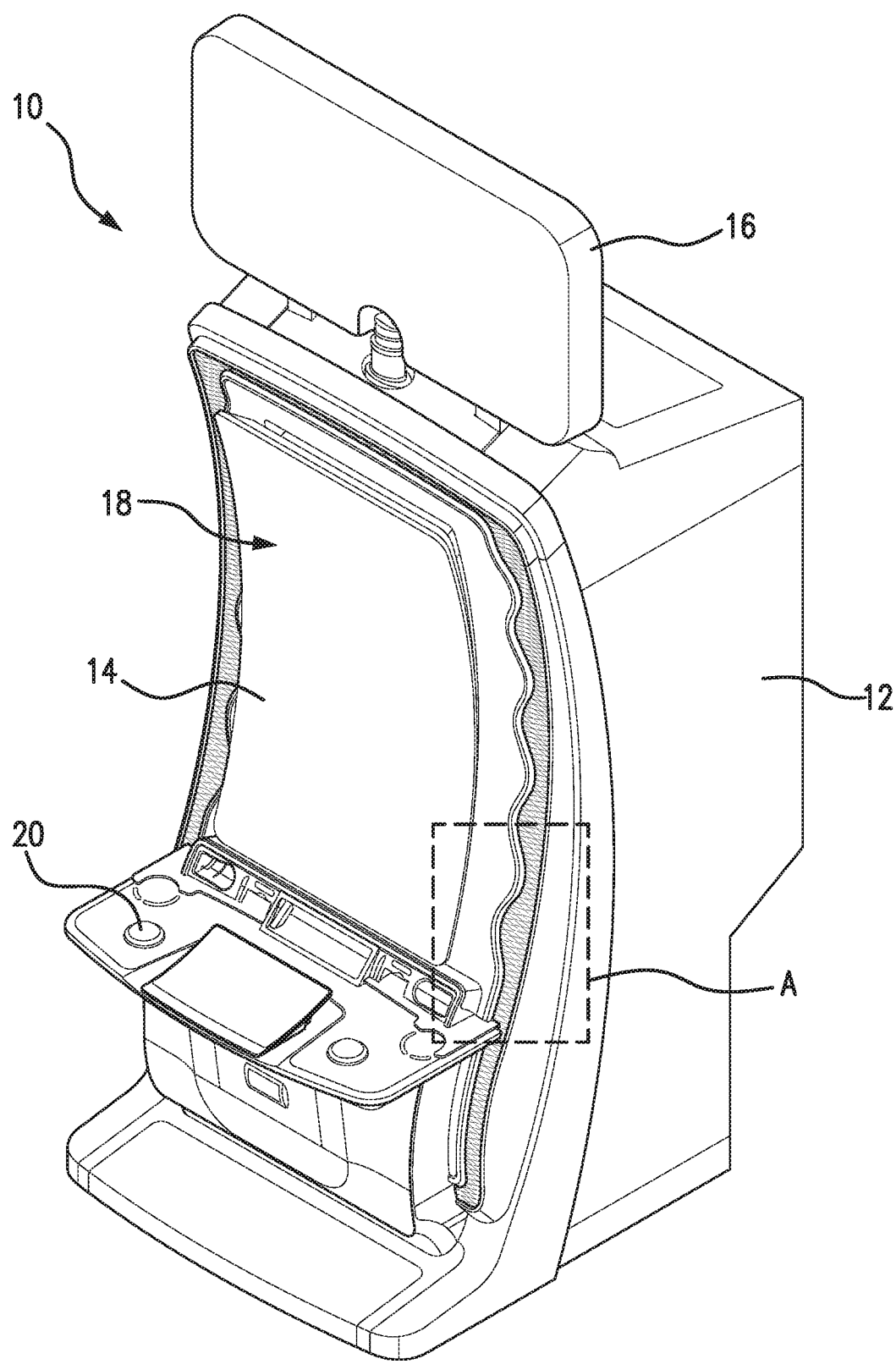
FIG. 1 is a perspective view of a free-standing gaming machine according to an embodiment of the disclosed concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door.

The input devices, output devices, and input/output devices are disposed on, and securely coupled to, the cabinet 12. By way of example, the output devices include a primary display 14, a secondary display 16, and one or more audio speakers. The primary display 14 or the secondary display 16 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen 18 mounted over the primary display 14, buttons 20 on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 18, buttons 20, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor, the card reader/writer, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer, the ticket dispenser for printing tickets redeemable for cash or credits, a wireless communication interface for transmitting cash or credit data to a nearby mobile device, and a network interface for depositing cash or credits to a remote account via an electronic funds transfer.

Figure 2:
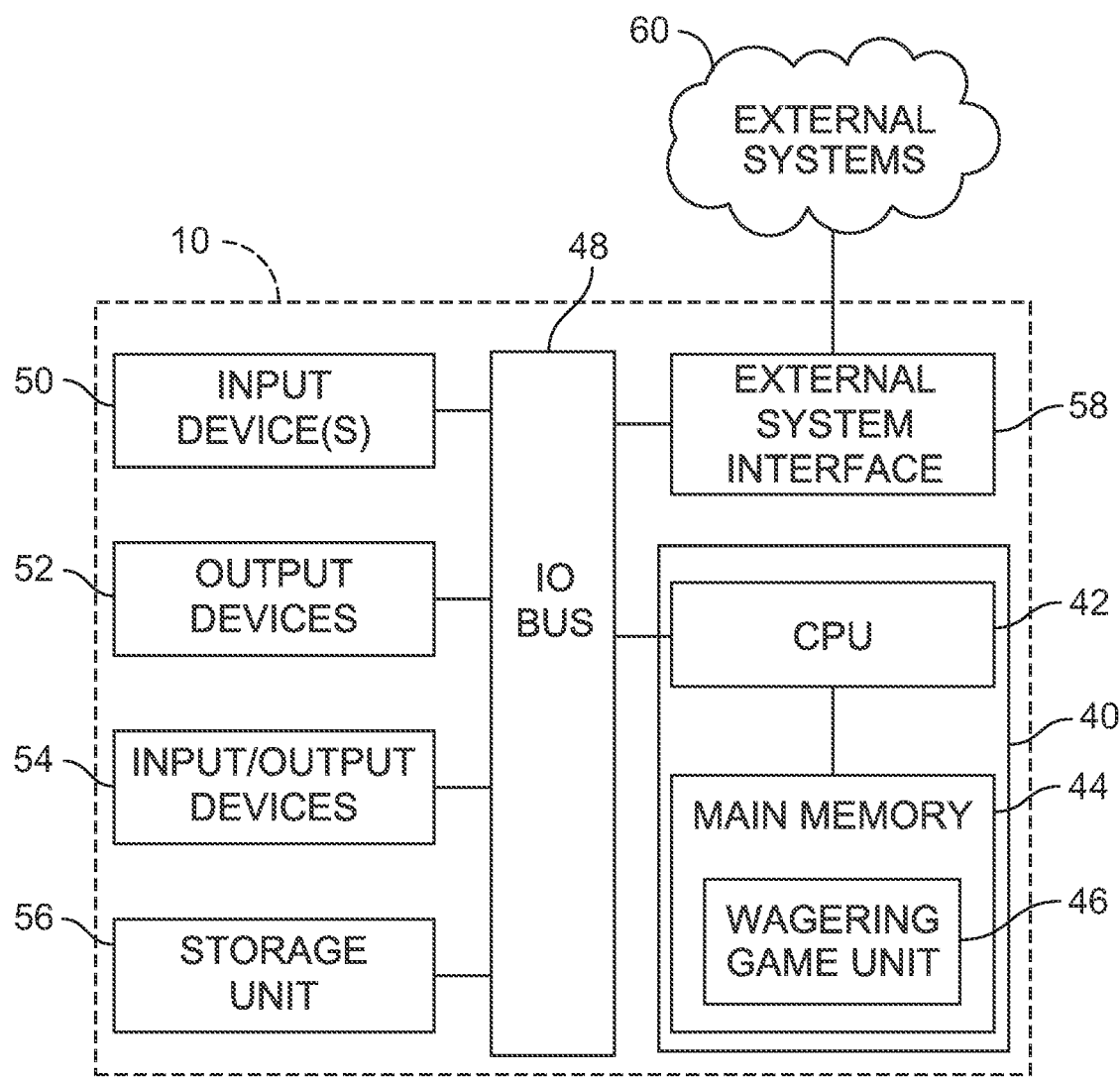
FIG. 2 is a schematic view of a gaming system according to an embodiment of the disclosed concepts.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
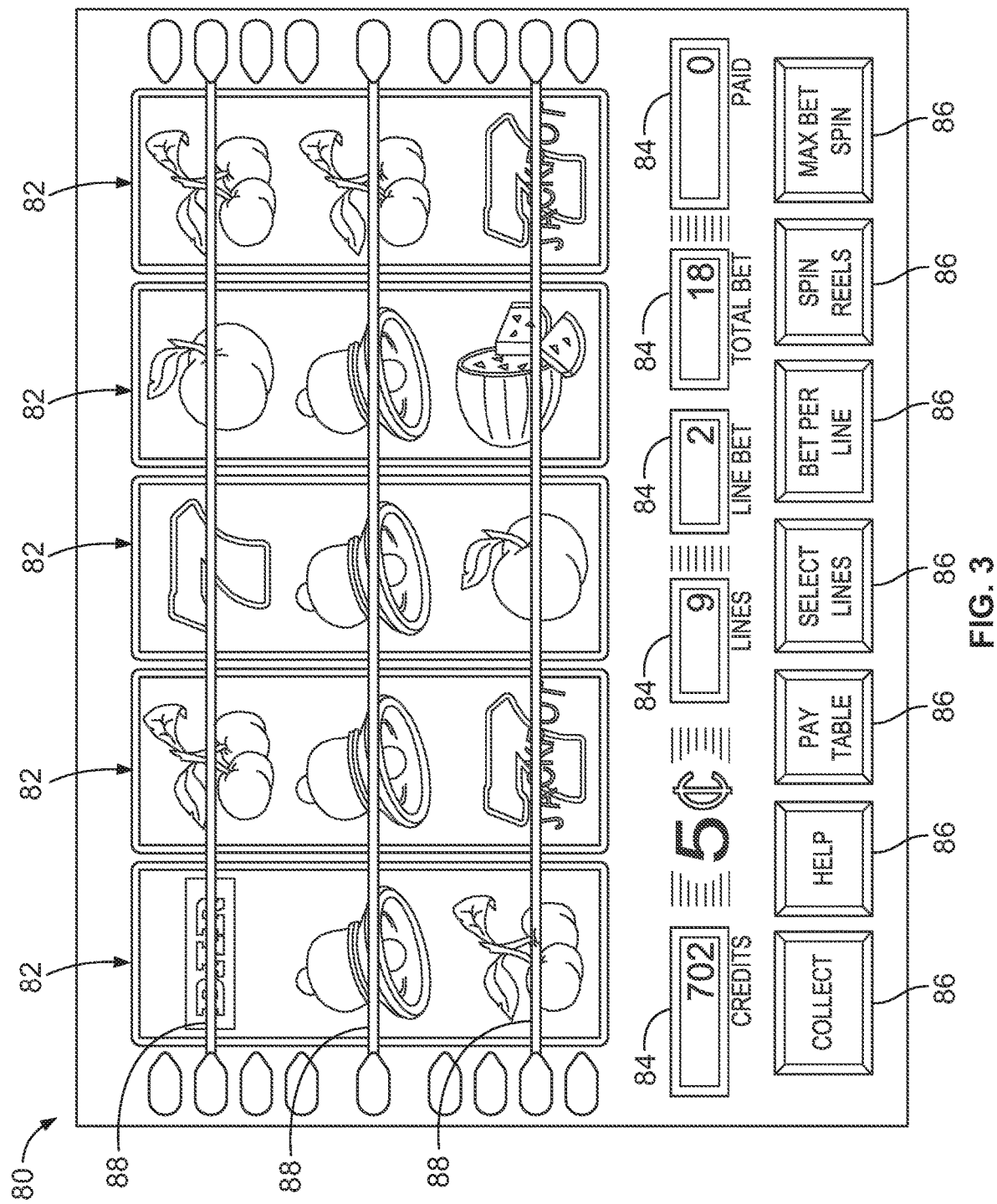
FIG. 3 is an image of an exemplary basic-game screen of a wagering game displayed on a gaming machine, according to an embodiment of the disclosed concepts.

Referring now to FIG. 3, there is illustrated an image of a basic-game screen 80 adapted to be displayed on the primary display 14 or the secondary display 16. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 20 shown in FIG. 1. The game-logic circuitry 40 operates to execute a wagering-game program causing the primary display 14 or the secondary display 16 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 14 or secondary display 16) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 14, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter. In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

With reference again to FIG. 1, in the example embodiment, the gaming machine 10 includes an emotive lighting system 100 that is configured to emit light according to one or more sequences to visually enhance gameplay at the gaming machine 10 and/or attract potential players to the gaming machine 10. The emotive lighting system 100 may be communicatively coupled to the game-logic circuitry 40 (or another controller) to facilitate controllable light sequences. In the example embodiment, the emotive lighting system 100 is coupled to the cabinet 12 adjacent to and partially surrounding the primary display 14. In other embodiments, the emotive lighting system 100 may be in a different position and/or orientation on the cabinet 12 relative to the primary display 14. In one example, the emotive lighting system 100 is not positioned on the same surface of the cabinet 12 as the primary display 14, but instead is extends along the sides and top surfaces of the cabinet 12. In other embodiments, the emotive lighting system 100 may have different configurations, including those described elsewhere herein.

As used herein, when referring to a direction of emitted light from a light source, it is to be understood that the emitted light is not limited to the specified direction, but rather a majority of the emitted light is directed towards the specified direction. Additionally, as used herein "activating" a light source refers to the act of selectively powering a light source for a period of time, and does not necessarily imply that the light source is continuously powered for the period of time. That is, the duty cycle of the supplied power is greater than 0%, but also less than or equal to 100%.

Figure 4:
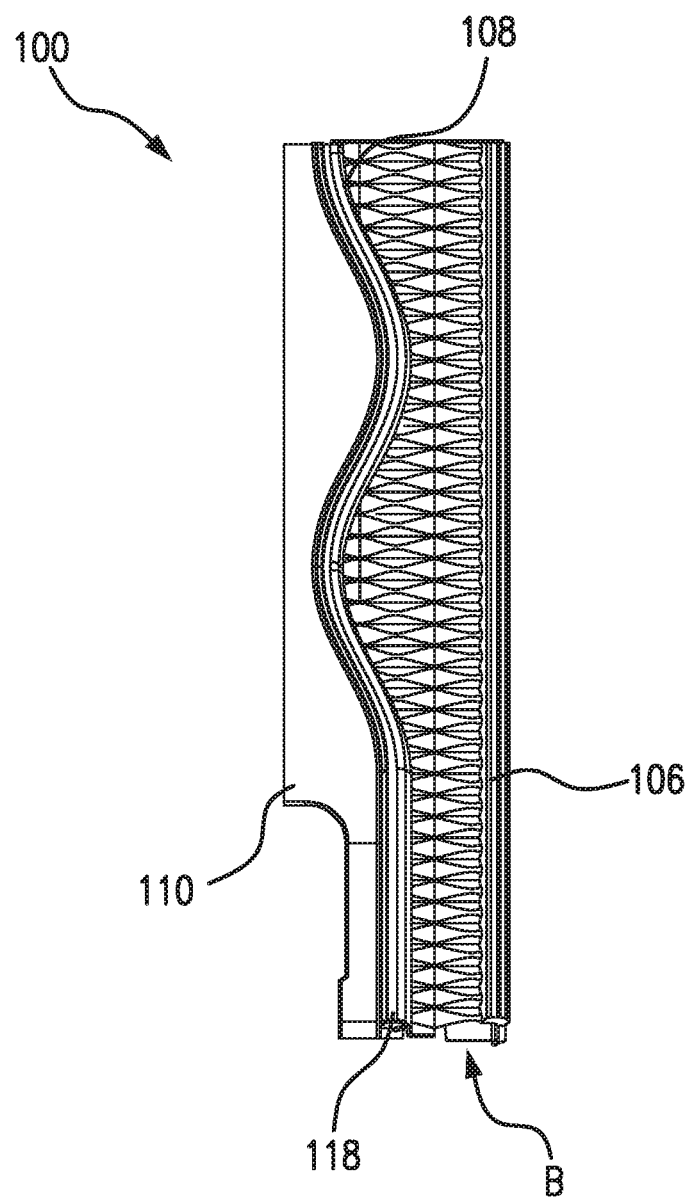
FIG. 4 is an enlarged view of a portion of an emotive lighting system according to an embodiment of the disclosed concepts.
Figure 5:
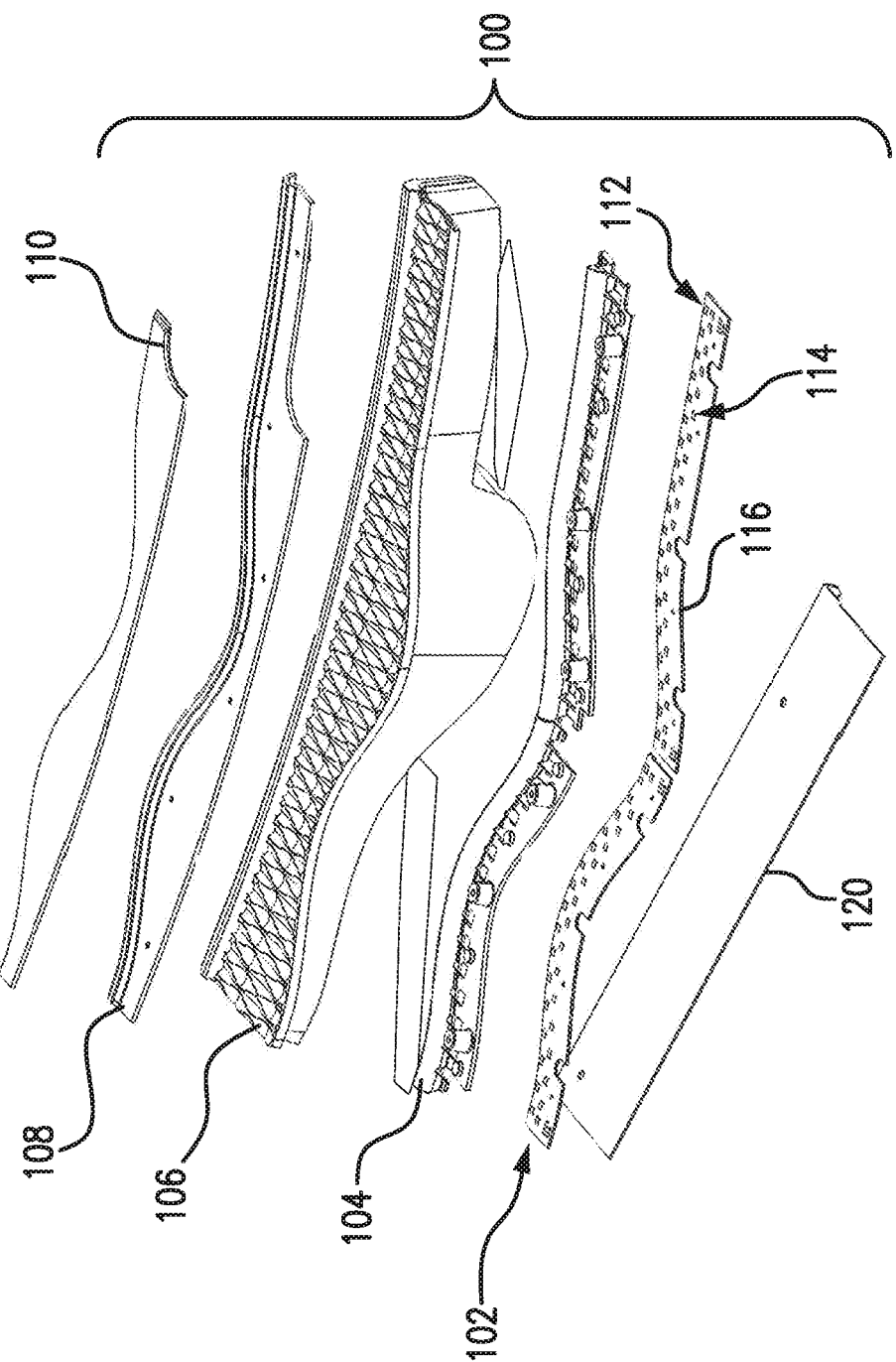
FIG. 5 is an exploded view of the portion of the emotive lighting system shown in FIG. 4 according to an embodiment of the disclosed concepts.

FIG. 4 is an enlarged view of a portion of the emotive lighting system 100 as indicated by area A (both shown in FIG. 1). Although the following description is directed to the portion indicated by area A, it is to be understood that the following description may be applicable for the rest of the emotive lighting system 100. As such, the enlarged portion is referred to herein with respect to FIG. 4 as the emotive lighting system 100. FIG. 5 is an exploded view of the emotive lighting system 100 shown in FIG. 4.

With reference to FIGS. 4 and 5, in the example embodiment, the emotive lighting system 100 includes a lighting assembly 102, an optical waveguide 104, a textured surface 106, a diffuser panel 108, and a support panel 110. In other embodiments, the emotive lighting system 100 may include additional, fewer, or alternative components, including those described elsewhere herein.

The lighting assembly 102 is configured to emit light. In the example embodiment, the lighting assembly 102 is oriented to emit light outward from a surface of the gaming machine 10 (shown in FIG. 1) facing a player. As used herein, "direct light" refers to light that is emitted from a light source that observed directly (light reflected by particulates within the air notwithstanding), whereas "indirect light" refers to light that has been reflected by an intermediate object or medium.

The lighting assembly 102 is communicatively coupled to the game-logic circuitry 40 (shown in FIG. 2) and/or a different controller to facilitate controllable lighting sequences. That is, the lighting assembly 102 may be configured to emit light having different colors, different brightness, in different patterns, and/or the like (collectively referred to as a "sequence"). Controlling the sequence may enable the game-logic circuitry 40 to incorporate the emitted light from the emotive lighting system 100 within the gameplay and/or create the appearance of different effects, such as rippling water. For example, the color and/or frequency of the emitted light may change when a feature game is achieved during a game. In some embodiments, the lighting assembly 102 receives electrical power from the game-logic circuitry 40. In other embodiments, the game-logic circuitry 40 (or another controller) controls a power supply to selectively provide power to the lighting assembly 102.

In the example embodiment, the lighting assembly 102 includes a first array of light-emitting devices 112 and a second array of light-emitting devices 114. A light-emitting device is any suitable device that converts electrical power into emitted light. The light-emitting devices may include, but are not limited to, light-emitting diodes (LEDs), organic LEDs, incandescent devices, florescent devices, arc devices, gas discharge devices, and the like. Each light-emitting device may include one or more light sources. For example, an LED-based light-emitting device may include several clustered LEDs to facilitate emitting multiple colors of light.

In the example embodiment, the lighting assembly 102 further includes circuit boards 116. The first and second arrays 112, 114 are coupled to the circuit board 116 and oriented to face the same direction (i.e., outward from the gaming machine 10). Orienting both the first and second arrays 112, 114 to face the same direction on the circuit boards 116 may reduce the complexity and manufacturing cost of the lighting assembly 102. In other embodiments, the first and second arrays 112, 114 may be coupled to the circuit boards 116 in a different orientation. For example, the first array 112 may be oriented to face a first direction while the second array 114 may be oriented in a second direction at an oblique angle (or orthogonal angle) relative to the first direction. In certain embodiments, the first and second arrays 112, 114 may be divided into separate circuit boards 116. In the example embodiment, the circuit board 116 is configured to provide power and/or control signals to the first and second arrays 112, 114. That is, the circuit boards 116 include one or more wire traces, connectors, electrical components, power sources, and/or other suitable components to deliver power and control signals to the arrays 112, 114. The circuit boards 116 may include other components and features, such as openings to receive fasteners or data connectors for debugging and monitoring the lighting assembly 102.

The optical waveguide 104 is coupled to the lighting assembly 102. In particular, the optical waveguide 104 is positioned over the first array 112 while the second array 114 is uncovered by the waveguide 104. The optical waveguide 104 may be segmented or a singular component. For example, the waveguide 104 may be segmented to match the number of circuit boards 116. The waveguide 104 is configured to redirect emitted light from the first array 112 from a first direction to a second direction. That is, the waveguide 104 includes one or more features (e.g., reflective surfaces, etc.) that guide visible light to the second direction as indirect light. The waveguide 104 enables the first array 112 to be oriented to face the first direction and still provide a substantial amount of light towards the second direction, thereby reducing the complexity of the circuit boards 116 and the cost of manufacturing the emotive lighting system 100. The indirect light may be a portion or all of the emitted visible light from the first array 112. In the example embodiment, the optical waveguide 104 is configured to create individual light paths for each light-emitting device of the first array 112 to isolate at least a portion of the light between the light-emitting devices. In other embodiments, the optical waveguide 104 has light paths that are shared between a plurality of the light-emitting devices.

In the example embodiment, the textured surface 106 is positioned adjacent to the lighting assembly 102 and the optical waveguide 104. In at least some embodiments, the textured surface 106 is integrated with the cabinet 12 of the gaming machine 10 (both shown in FIG. 1). In other embodiments, the textured surface 106 is coupled to the cabinet 12. The textured surface 106 is positioned relative to the lighting assembly 102 and the waveguide 104 to receive the indirect light from the first array 112 via the waveguide 104. The textured surface 106 includes one or more features that, when selectively exposed to the indirect light of the first array 112, creates emotive visual effects including a combination of illuminated areas, unilluminated areas, and light gradients. The features may include, but are not limited to, channels, ridges, grooves, reflective surfaces, colored surfaces, and the like. In the example embodiment, the textured surface 106 has three-dimensional features having depth to create shadows and other lighting effects as described herein.

The diffuser panel 108 is coupled to the optical waveguide 104 to provide structural support to the lighting system 100 and to provide additional emotive lighting from the second array 114. The diffuser panel 108 receives direct light from the second array 114 and diffuses the received light such that the intensity of light observed through the panel 108 is reduced and the light appears to be spread over the surface of the panel 108. As the light spreads along the surface of the diffuser panel 108, the light from adjacent light-emitting devices may blend together such that changes in the emitted light between adjacent light-emitting devices (e.g., changes in color and intensity) may appear to be continuous. That is, although adjacent light-emitting devices of the second array 114 are separated from each other on the circuit board 116, the diffused light from each of the adjacent light-emitting devices does not appear to be separated. In other embodiments, the diffuser panel 108 and the second array 114 may be configured to cause the diffused light to appear separated between light-emitting devices.

In the example embodiment, the support panel 110 is coupled to the diffuser panel 108. The support panel 110 may be opaque such that light emitted through a portion of the diffuser panel 108 is blocked by the support panel 110. In other embodiments, the support panel 110 may be at least partially transparent. Alternatively, the lighting system 100 may not include the support panel 110. Although the support panel 110 blocks some of the light from the diffuser panel 108, a portion of the diffuser panel 108 may remain exposed to emit diffused light. In the example embodiment, a ridge 118 of the diffuser panel 108 extends beyond the support panel 110 adjacent to the optical waveguide 104 and the textured surface 106. The diffused light from the second array 114 is emitted via the ridge 118 at least in a first direction (i.e., the same direction the light-emitting devices of the second array 114 are facing).

In the example embodiment, the lighting assembly 102, the optical waveguide 104, the textured surface 106, the diffuser panel 108, and the support panel 110 have non-uniform edges (i.e., non-straight or curvy edges). The edges may increase the visual effect of the emotive lighting system 100 as described herein. It is to be understood that other suitable edges and geometry (including uniform edges and geometry) may be used in the system 100 to provide unique emotive lighting effects.

In the example embodiment, the emotive lighting system 100 further includes a cabinet bracket 120. The cabinet bracket 120 is configured to couple the system 100 to the cabinet 12 and/or other components of the gaming machine 10. The bracket 120 may be coupled to the lighting assembly 102, the optical waveguide 104, the textured surface 106, the diffuser panel 108, and/or the support panel 110. In at least some embodiments, the bracket 120 includes one or more fastening points to receive one or more fasteners (e.g., screws, bolts, etc.) that extend through corresponding holes of the lighting assembly 102, the optical waveguide 104, the textured surface 106, the diffuser panel 108, and/or the support panel 110.

Figure 6:
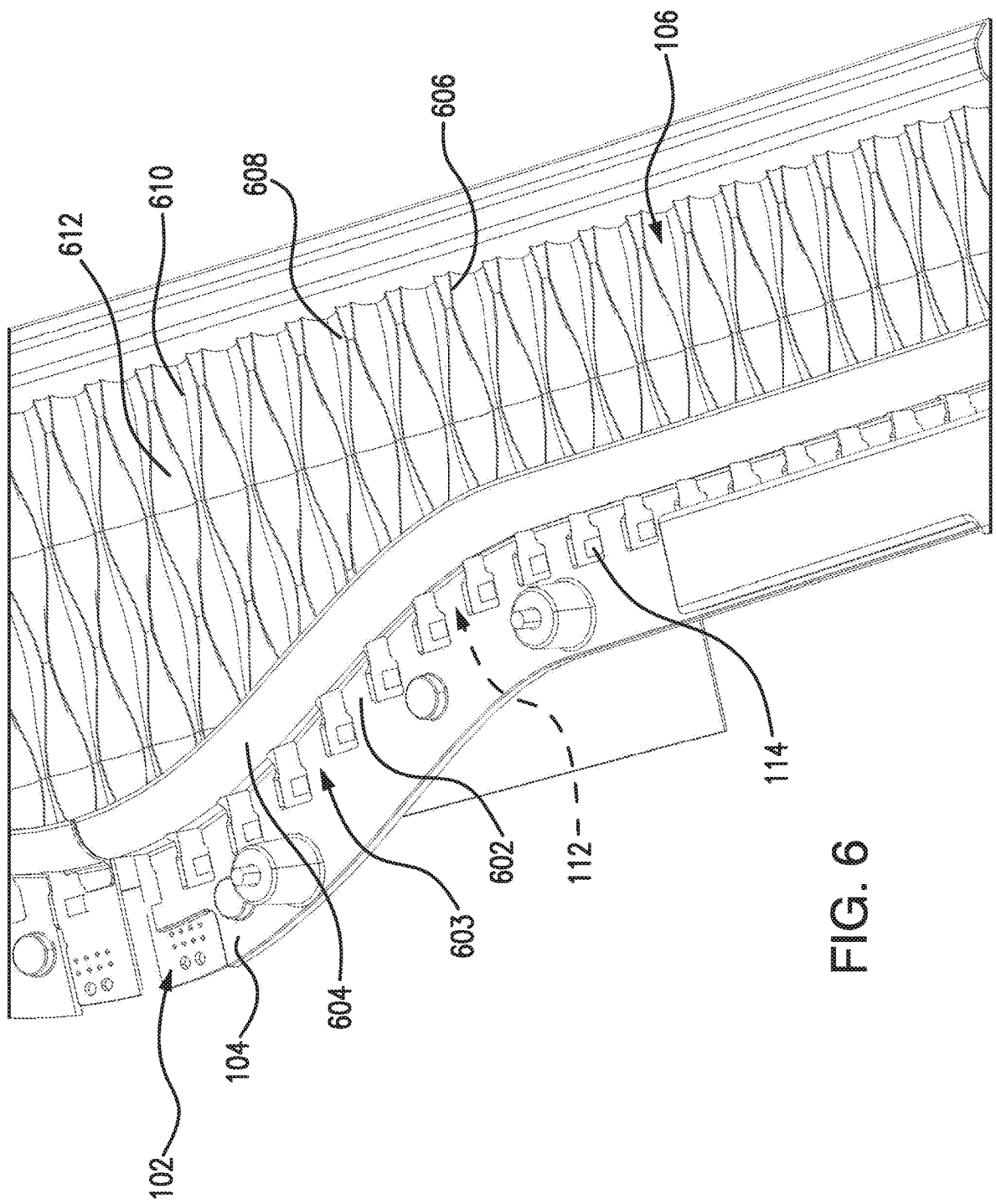
FIG. 6 is a perspective view of the portion of the emotive lighting system shown in FIG. 4 with the diffuser removed according to an embodiment of the disclosed concepts.

FIG. 6 is a perspective of a portion of the lighting system 100 shown in FIG. 4. More specifically, the diffuser panel 108 and the support panel 110 (both shown in FIG. 4) have been removed to expose the lighting assembly 102 and the optical waveguide 104. In the example embodiment, the waveguide 104 includes a plurality of fingers 602 that extend from the first array 112 to at least adjacent to the textured surface 106. The fingers 602 include one or more features to guide light emitted from the first array 112 to the textured surface 106, such as internal reflective surfaces. In the example embodiment, each finger 602 over a single, respective light-emitting device of the first array 112. In other embodiments, each finger 602 extends over a plurality of respective light-emitting devices. At a proximal end 603 of the fingers 602 (i.e., the end overlapping the first array 112), the fingers 602 are spaced apart from each other to cause a substantial (if not all) of the light received via the proximal end 603 of each finger 602 to be from the respective light emitting-device and to not impede the second array 114.

Optical waveguide 104 further includes a light pipe 604 that is coupled to each of the fingers 602. The light pipe 604 is configured receive light emitted by the first array 112 via the fingers 602 and redirect the light towards the textured surface 106. The light pipe 604 is continuous between a plurality of the fingers 602 such that a portion of the light emitted from a light-emitting device of the first array 112 may travel along the light pipe 604. As a result, the indirect light emitted by the first array 112 may appear to an observer to be continuous.

In the example embodiment, the textured surface 106 includes a plurality of raised walls 606 that define a plurality of channels 608 therebetween. The channels 608 are positioned adjacent to the light pipe 604 to receive indirect light. The channels 608 may have varying depth, width, length, and the like to adjust the lighting effects. In the example embodiment, the walls 606 (and by extension, the channels 608) are curved to form a pattern extended along the textured surface 106. A portion of the channels 608 are substantially aligned with a respective light-emitting device of the first array 112 and a finger 602. These channels 608 are referred to herein as "aligned channels 610." The aligned channels 610 are positioned relative to the light-emitting device such that a substantial amount of the light emitted by the light-emitting device and guided through the optical waveguide 104 is directed through the aligned channels 610. A second portion of the channels 608 are unaligned with any light-emitting device of the first array 112 and are referred to herein as "unaligned channels 612." One or more unaligned channels 612 may be positioned between two aligned channels 610. Although the unaligned channels 612 may receive some indirect light, the amount of indirect light received by the unaligned channels 612 may be less than the amount received by the aligned channels 610. In other embodiments, a plurality of aligned channels 610 may be positioned adjacent each other such that each light-emitting device of the first array 112 is associated with a plurality of aligned channels 610. In certain embodiments, alignment of the channels 608 may not affect the amount of light received by the channels 608, but rather other aspects of the channels 608 (i.e., depth, shape, etc.) affect the amount of light received.

As a result of the non-uniform walls and the varying amounts of light received by each channel 608, the textured surface 106 may have various illuminated, unilluminated, and gradient areas as a result of the indirect light from the first array 112. In the example embodiment, indirect light received by the aligned channels 610 may decrease in brightness and intensity the further away from the waveguide 104 the light travels, particularly after a width We of the channel 610 narrows. The unaligned channels 612 may be primarily unilluminated from the indirect light, thereby creating shadows in between the aligned channels 610. The shadows may facilitate separating and/or contrasting the light received by two adjacent aligned channels 610.

Figure 7:
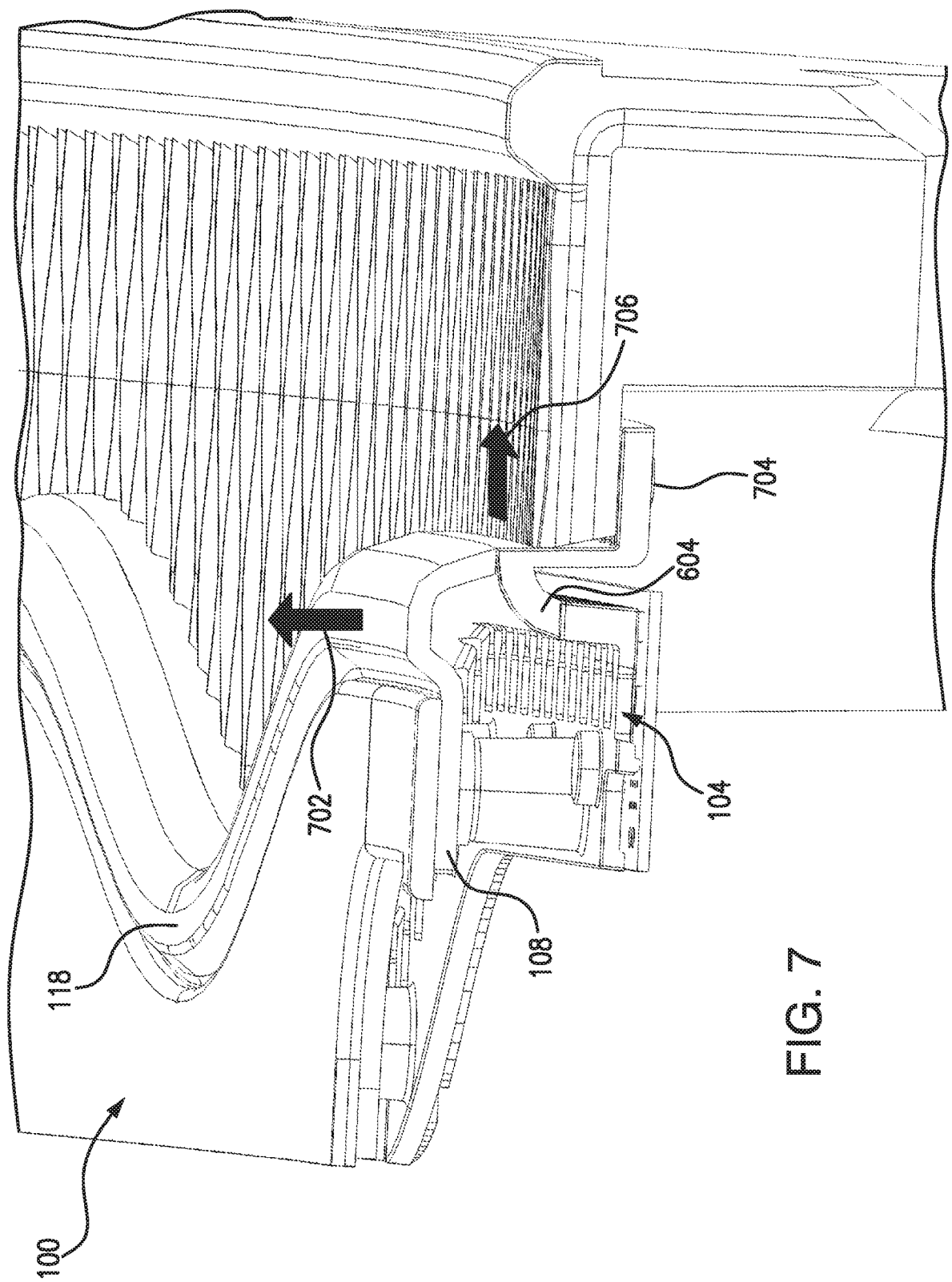
FIG. 7 is a cross-sectional view of the portion of the emotive lighting system shown in FIG. 4 according to an embodiment of the disclosed concepts.

FIG. 7 is a cross-sectional view of the example portion of the emotive lighting system 100 at edge B (shown in FIG. 4). It is to be understood that, when describing component orientation and position with respect to FIG. 7, positional terms such as "above" and "below" refer to the position as illustrated in FIG. 7 rather than the actual position of the components relative to the gaming machine 10 (shown in FIG. 1). For example, a component that is "above" another component in FIG. 7 actually may be positioned outward away from the gaming machine 10 and the other component when the gaming machine 10 is fully assembled.

In the example embodiment, the ridge 118 of the diffuser panel 108 is positioned above the light pipe 604 of the optical waveguide 104. Light emitted by the second array 114 (shown in FIG. 5) is received by the diffuser panel 108 and emitted as diffused light to an observer via the ridge 118. A substantial portion of the diffused light emitted via the ridge is emitted in a first direction 702. In the example embodiment, the first direction 702 is directed away from the lighting system 100 and the gaming machine 10. In other embodiments, the first direction 702 may be at a different angle relative to the lighting system 100.

In the example embodiment, the light pipe 604 of the waveguide 104 is positioned below the diffuser panel 108. A distal end 704 of the light pipe 604 extends below the textured surface 106 such that a substantial portion of the indirect light is emitted from the light pipe 604 in a second direction 706 towards the channels 608 or downward to prevent the indirect light from significantly interfering with the diffused light emitted via the ridge 118. In at least some embodiments, the second direction 706 is orthogonal relative to the first direction 702. In other embodiments, the second direction 706 is oblique relative to the first direction 702. For example, the second direction may be at angle greater than 90 degrees relative to the first direction 702. Although the first and second directions 702, 706 are represented as vector rays, it is to be understood that the first and second directions 702, 706 may represent an arc area spanning a range of angles. The textured surface 106 is positioned below the ridge 118 to limit the amount of diffused light received by the channels 608.

Figure 8:
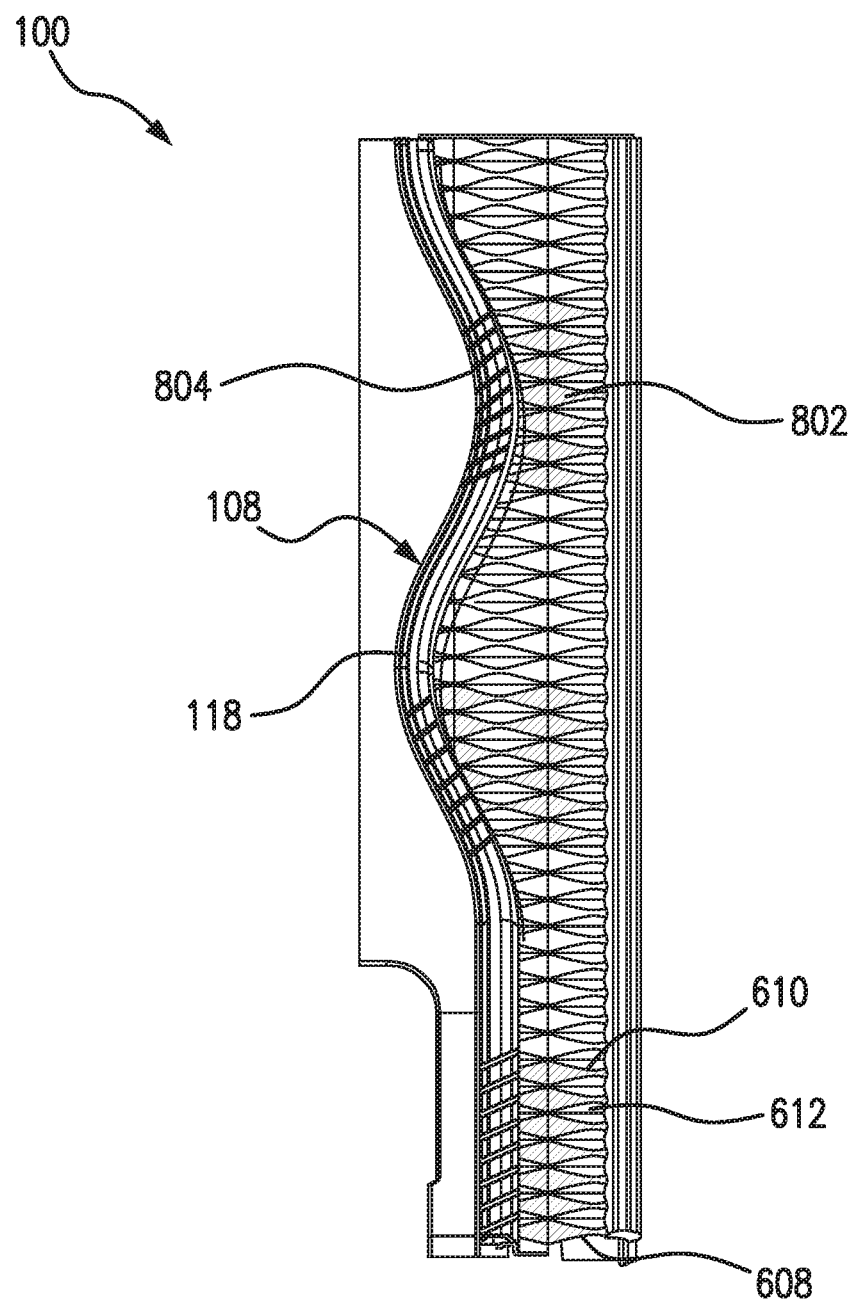
FIG. 8 illustrates example lighting sequences using the portion of the emotive lighting system shown in FIG. 4 according to an embodiment of the disclosed concepts.

FIG. 8 illustrates example lighting sequences that may be used with the portion of the lighting system 100 shown in FIG. 4. The lighting sequence may be controlled by the logic circuitry 40 (shown in FIG. 2) to supplement other aspects of the gaming machine 10 (shown in FIG. 1), such as gameplay, other lighting systems, and the like. In other embodiments, the lighting sequence may include additional, fewer, or alternative lighting features, including those described elsewhere herein.

In the example embodiment, the channels 608 are illuminated via the optical waveguide 104 according to a first lighting sequence 802. The ridge 118 is illuminated according to a second lighting sequence 804. That is, the logic circuitry 40 is configured to generate control signals that cause the first and second arrays of light-emitting devices 112, 114 to selectively emit light according to the first and second lighting sequences 802, 804, respectively. A lighting sequence is a set of lighting characteristics that are predefined for a period of time. The lighting characteristics may include, but are not limited to, color, intensity, duty cycle, active or inactive states, and the like. Although the lighting sequences 802, 804 in FIG. 8 are represented as shading, it is to be understood that the shading (or lack thereof) do not necessarily represent a particular area as illuminated or unilluminated. Moreover, the illustrated state of the lighting system 100 may only represent a portion of the lighting sequences 802, 804 as captured at a point in time. That is, the lighting sequences 802, 804 may be dynamic over time.

The first lighting sequence 802 causes at least some of the aligned channels 610 to receive indirect light from the waveguide 104. The adjacent unaligned channels 612 may not receive as much of the indirect light as the aligned channels 610, thereby creating a contrast between each aligned channel 610. In other embodiments, the unaligned channels 612 may receive the same amount (or more) light than the aligned channels 610. In the example embodiment, the second lighting sequence 804 is synchronized with the first lighting sequence 802. That is, the lighting characteristics of the first lighting sequence 802 matches, supplements, or is otherwise linked to the second lighting sequence 804. In other embodiments, the first lighting sequence 802 may be independent from the second lighting sequence 804. In certain embodiments, one of the first and second lighting sequences 802, 804 changes in response to events detected by the logic circuitry 40 (e.g., gameplay events, credit events, etc.) while the other lighting sequence is unaffected by the detected events. The lighting sequences 802, 804 may be configured to repeat for the period of time and, in some embodiments, may repeat until new lighting sequences are received from the logic circuitry 40.

Figure 9:
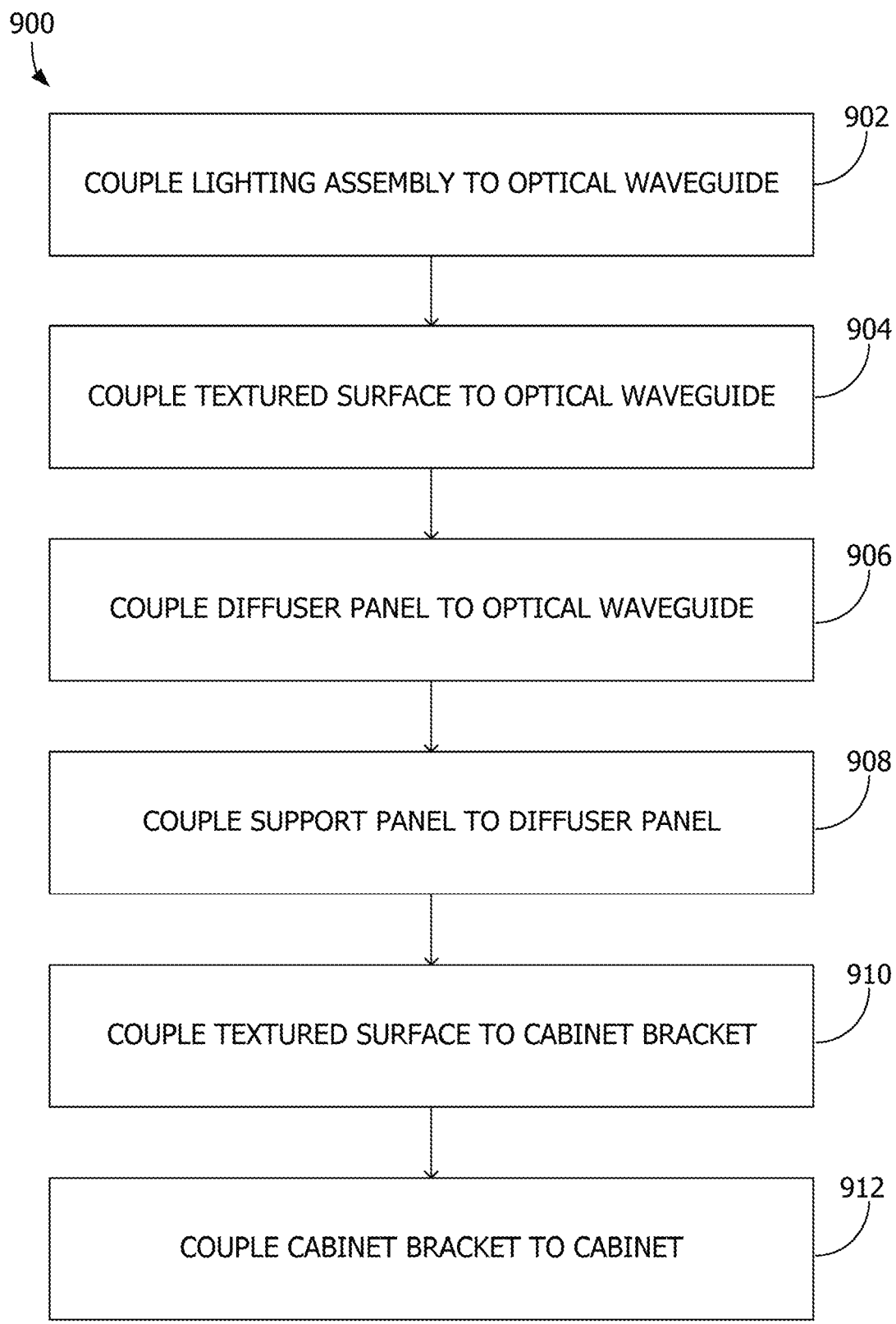
FIG. 9 is a flow diagram of an example method of operating a gaming machine including an emotive lighting system in accordance to an embodiment of the disclosed concepts.

FIG. 9 is a flow diagram of an example assembly method 900 to assemble an example emotive lighting assembly. Although the method 900 is described with respect to the portion of the emotive lighting system 100 shown in FIG. 4, it is to be understood that the method 900 applies to the rest of the system 100 as well. That this, the method 900 may include additional steps for combining each portion of the system 100 together and to the rest of the gaming machine 10 (shown in FIG. 1). In other embodiments, the method 900 may include additional, fewer, or alternative steps, including those described elsewhere herein.

With respect to FIGS. 1, 4, and 9, in the example embodiment, the lighting assembly 102 is coupled 902 to the optical waveguide 104. In at least some embodiments, the lighting assembly 102 and the optical waveguide 104 are coupled 902 together using any suitable fasteners, adhesives, and/or features (e.g., hooks, grooves, etc.). The textured surface 106 is coupled 904 to the optical waveguide 104 offset from the lighting assembly 102. The diffuser panel 108 is coupled 906 to the waveguide 104, and the support panel 110 is coupled 908 to the diffuser panel 108. In the example embodiment, the lighting assembly 102, the waveguide 104, the diffuser panel 108, and the support panel 110 have openings aligned together to receive fasteners to secure the components together.

In the example embodiment the textured surface 106 is coupled 910 to the cabinet bracket 120, and the cabinet bracket 120 is coupled 910 to the cabinet 12 of the gaming machine 10 to secure the lighting system 100 to the gaming machine 10. In other embodiments, the lighting system 100 is coupled to the cabinet 12 without the bracket 120. Each portion of the emotive lighting system 100 may be coupled to the cabinet 12 separately or combined with other portions of the lighting system 100.

Figure 10:
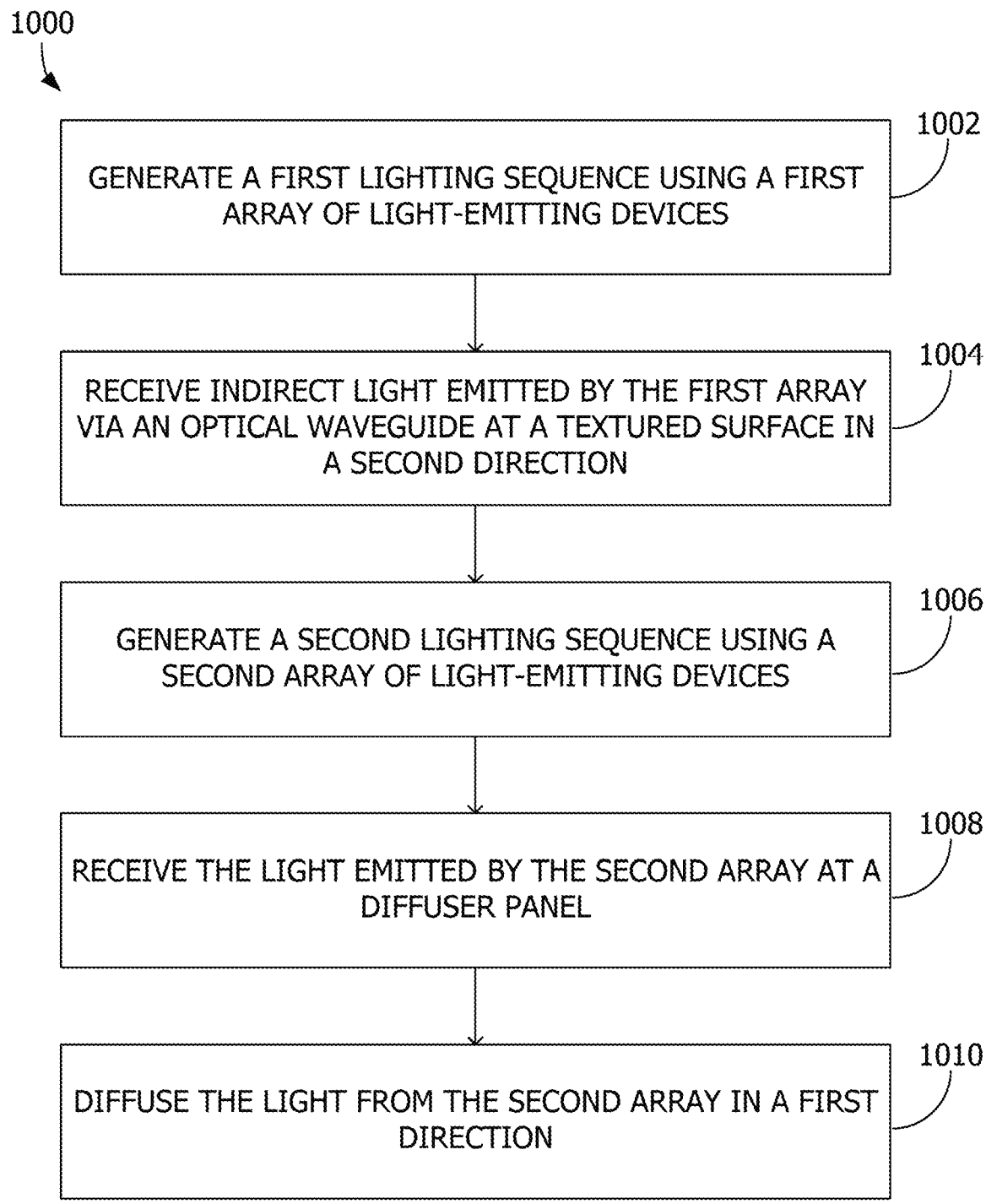
FIG. 10 is a flow diagram of an example method of assembling a gaming machine with an emotive lighting system in accordance to an embodiment of the disclosed concepts.

FIG. 10 is a flow diagram of an example method 1000 for using an emotive lighting system of a gaming machine. In the example embodiment, the lighting system 100 (shown in FIGS. 1 and 4) may be used to perform the method 1000. In at least some embodiments, the logic circuitry 40 (shown in FIG. 2) may control the lighting system 100 to perform the method 1000. In other embodiments, the system 100 may be controlled by another controller, such as a controller dedicated to operating the system 100. In such embodiments, the controller may be communicatively coupled to the logic circuitry 40. In certain embodiments, the method 1000 may include additional, fewer, or alternative steps, including those described elsewhere herein.

In the example embodiment, with respect to FIGS. 2, 4, and 10, the logic circuitry 40 causes the first array 112 to generate 1002 a first lighting sequence over a period of time. The first lighting sequence includes the first array 112 to emit light have a particular set of lighting characteristics over the period of time. The textured surface 106 receives 1004 the indirect light emitted from the first array 112 via the optical waveguide 104. More specifically, the channels 608 (shown in FIG. 6) receive the indirect light in a second direction that is oblique or orthogonal to a first direction in which the first array 112 is oriented. The logic circuitry 40 also causes the second array 114 to generate 1006 a second lighting sequence over the period of time. The second lighting sequence may have the same lighting characteristics of the first lighting sequence. In other embodiments, the second lighting sequence may be different from the first lighting sequence. For example, the first lighting sequence may have lighting characteristics that supplement the second lighting sequence. In certain embodiments, the first and second lighting sequences may be selected by the logic circuitry 40 based on one or more contextual criteria, such as gameplay criteria, inactivity criteria, credit criteria, and the like. The diffuser panel 108 receives 1008 the light emitted by the second array 114 and diffuses 1010 the received light to be emitted as diffused light in at least in the first direction. The first and second lighting sequences continue over the period of time until the logic circuitry 40 adjusts the lighting sequences.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:
   a cabinet;
   an emotive lighting system coupled to the cabinet, the emotive lighting system comprising:
   a textured surface comprising a plurality of walls that define a plurality of channels;
   a first array of light-emitting devices oriented to emit light in a first direction, wherein each channel of the plurality of channels is aligned with at least one light-emitting device of the first array of light-emitting devices;
   an optical waveguide comprising a plurality of fingers, each finger of the plurality of fingers being positioned over a respective light-emitting device of the first array of light-emitting devices, the optical waveguide configured to guide light from the first array of light-emitting devices towards the plurality of channels in a second direction at an oblique or orthogonal angle relative from the first direction, wherein adjacent fingers of the plurality of fingers are spaced apart to define a plurality of gaps; and
   a second array of light-emitting devices configured to emit light in the first direction substantially unimpeded by the optical waveguide, wherein the second array of light-emitting devices occupy the plurality of gaps; and logic circuitry configured to cause each light-emitting device of the first array of light-emitting devices to selectively emit light such that each channel of the plurality of channels is selectively illuminated with indirect light from the aligned at least one light-emitting device and substantially isolated from indirect light emitted from unaligned light-emitting devices of the first array of light-emitting devices.

2. The gaming machine of claim 1, wherein the emotive lighting system further comprises at least one diffuser panel positioned over the second array of light-emitting devices to diffuse the light emitted in the first direction.

3. The gaming machine of claim 2, wherein the emotive lighting assembly further comprises a support panel coupled to the diffuser panel, the support panel configured to cover a portion of the diffuser panel, wherein the diffuser panel includes a ridge uncovered by the support panel that emits the diffused light.

4. The gaming machine of claim 1, wherein each light-emitting device of the first array of light-emitting devices is associated with a corresponding light-emitting device of the second array of light-emitting devices, wherein the logic circuitry is configured to cause each light-emitting device of the first array of light-emitting devices to emit light synchronously with the corresponding light-emitting device of the second array of light-emitting devices.

5. The gaming machine of claim 1, wherein the logic circuitry is configured to cause the first array of light-emitting devices to selectively emit light according to a first sequence, and to cause the second array of light-emitting devices to selectively emit light according to a second sequence simultaneous to the first sequence.

6. The gaming machine of claim 1, wherein the first direction extends outward from the cabinet.

7. The gaming machine of claim 1, wherein the plurality of channels extend in the second direction, and the second direction is orthogonal relative to the first direction.

8. The gaming machine of claim 1, wherein the plurality of walls of the textured surface further defines an unaligned channel that is unaligned with any light-emitting device of the first array of light-emitting devices, the unaligned channel positioned between two channels of the plurality of channels.

9. The gaming machine of claim 1, wherein the optical waveguide further comprises a light pipe coupled to the plurality of fingers, the plurality of fingers configured to guide light emitted from the first array of light-emitting devices to the light pipe, wherein the light pipe emits the light received from the plurality of fingers in the second direction.

10. A method of operating a gaming machine including an emotive lighting system, the gaming machine including logic circuitry communicatively coupled to the emotive lighting system, the method comprising:
 causing, by the logic circuitry, a first array of light-emitting devices of the emotive lighting system to emit light according to a first lighting sequence, the first array of light-emitting devices oriented to face a first direction;
 receiving, by a plurality of fingers of an optical waveguide of the emotive lighting system, the light emitted in the first direction by the first array of the light-emitting devices, each finger of the plurality of fingers positioned over a respective light-emitting device of the first array of the light-emitting devices, wherein adjacent fingers of the plurality of fingers are spaced apart to define a plurality of gaps;
 causing, by the logic circuitry, a second array of light-emitting devices of the emotive lighting system to emit light in the first direction substantially unimpeded by the optical waveguide according to a second lighting sequence, the second array of light-emitting devices occupying the plurality of gaps:
 guiding, by the optical waveguide, the received light from the first array of the light-emitting devices, towards a second direction;
 emitting, by the optical waveguide, indirect light from the first array of light-emitting devices towards a textured surface of the emotive lighting system in the second direction, the textured surface including a plurality of walls that define a plurality of channels; and
 receiving, by at least one channel of the plurality of channels, the indirect light.

11. The method of claim 10, further comprising diffusing, by a diffuser panel of the emotive lighting assembly, the light emitted by the second army of light-emitting devices in the first direction.

12. The method of claim 10 further comprising synchronizing, by the logic circuitry, the first lighting sequence with the second lighting sequence to occur simultaneously.

13. The method of claim 10, wherein the first lighting sequence includes a set of lighting characteristic of the light to be emitted by the first array of light-emitting devices over a period of time.

14. A gaming system comprising
 gaming machine comprising:
  a cabinet; and
  an emotive lighting system coupled to the cabinet, the emotive lighting system comprising:
   a textured surface comprising a plurality of walls that define a plurality of channels;
   a first array of light-emitting devices oriented to emit light in a first direction, wherein each channel of the plurality of channels is aligned with at least one light-emitting device of the first array of light-emitting devices;
   an optical waveguide comprising a plurality of fingers, each finger of the plurality of fingers being positioned over a respective light-emitting device of the first array of light-emitting devices, the optical waveguide configured to guide light from the first array of light-emitting devices towards the plurality of channels in a second direction at an oblique or orthogonal angle relative from the first direction, wherein adjacent fingers of the plurality of fingers are spaced apart to define a plurality of gaps; and
  a second array of light-emitting devices configured to emit light in the first direction substantially unimpeded by the optical waveguide, wherein the second array of light-emitting devices occupy the plurality of gaps; and
 logic circuitry configured to cause each light-emitting device of the first array of light-emitting devices to selectively emit light such that each channel of the plurality of channels is selectively illuminated with indirect light from the aligned at least one light-emitting device and substantially isolated from indirect light emitted from unaligned light-emitting devices of the first array of light-emitting devices.

15. The gaming system of claim 14, wherein the emotive lighting system further comprises at least one diffuser panel positioned over the second array of light-emitting devices to diffuse the light emitted in the first direction.

16. The gaining system of claim 14, wherein the logic circuitry is configured to cause the first array of light-emitting devices to selectively emit light according to a first sequence, and to cause the second array of light-emitting devices to selectively emit light according to a second sequence simultaneous to the first sequence.

17. The gaming system of claim 14, wherein the plurality of walls of the textured surface further defines an unaligned channel that is unaligned with any light-emitting device of the first array of light-emitting devices, the unaligned channel positioned between two channels of the plurality of channels.

18. The gaming machine of claim 1, wherein the first direction extends outward from a surface of the cabinet facing a player.

19. The gaming system of claim 14, wherein the first direction extends outward from a surface of the cabinet facing a player.

20. The gaming system of claim 14, wherein the optical waveguide further comprises a light, pipe coupled to the plurality of fingers, the plurality fingers configured to guide light emitted from the first array of light-emitting, devices to the light pipe, wherein the light pipe emits the light received from the plurality of fingers in the second direction.

* * * * *